(12) United States Patent
Stalder et al.

(10) Patent No.: US 11,214,389 B2
(45) Date of Patent: Jan. 4, 2022

(54) INDIVIDUALIZED PACKAGING

(71) Applicant: Kern AG, Konolfingen (CH)

(72) Inventors: Marcel Stalder, Bolligen (CH); Wolfgang Freyer, Grosshochstetten (CH); Patrick Vogel, Belp (CH)

(73) Assignee: KERN AG, Konolfingen (CH)

( * ) Notice: Subject to any disclaimer, the term of this patent is extended or adjusted under 35 U.S.C. 154(b) by 260 days.

(21) Appl. No.: 16/608,394

(22) PCT Filed: Apr. 23, 2018

(86) PCT No.: PCT/EP2018/060311
§ 371 (c)(1),
(2) Date: Oct. 25, 2019

(87) PCT Pub. No.: WO2018/197400
PCT Pub. Date: Nov. 1, 2018

(65) Prior Publication Data
US 2021/0107246 A1 Apr. 15, 2021

(30) Foreign Application Priority Data
Apr. 28, 2017 (CH) .................................... 00576/17

(51) Int. Cl.
*B31B 50/25* (2017.01)
*B31B 50/22* (2017.01)
(Continued)

(52) U.S. Cl.
CPC ............. *B65B 5/024* (2013.01); *B31B 50/22* (2017.08); *B31B 50/25* (2017.08); *B31B 50/26* (2017.08);
(Continued)

(58) Field of Classification Search
None
See application file for complete search history.

(56) References Cited

U.S. PATENT DOCUMENTS

| 4,300,679 A | 11/1981 | Benzschawel |
| 7,647,752 B2 | 1/2010 | Magnell |

(Continued)

FOREIGN PATENT DOCUMENTS

| CN | 103043277 A | 4/2013 |
| CN | 103231840 A | 8/2013 |

(Continued)

OTHER PUBLICATIONS

International Search Report for PCT/EP2018/060311 dated Aug. 17, 2018.

*Primary Examiner* — Hemant Desai
*Assistant Examiner* — Tanzim Imam
(74) *Attorney, Agent, or Firm* — Pearne & Gordon LLP

(57) ABSTRACT

A method for producing reusable packaging from a carton. A rectangular blank has sides X and Y, a total area xy, $2(a+h) \leq x \leq 3(a+h)+a$, and $y-2(h+r) \leq b \leq y$, where a and b are side dimensions, h is height, and r is width, or width reduced by height h, of the periphery region R of the finished packaging. The method includes: producing folding lines B in the blank parallel to a first side Y at these distances from the latter: $B_1$: $a_1=h$; $B_2$: $a_2=h+a$; $B_3$: $a_3=2h+a$; severing of two severing lines T, each starting from opposite sides X, along one of the folding lines B, or the extension thereof; selecting the distance between two end points $E_T$ of the severing lines T which are closer to an axis of symmetry $S_1$, which is parallel to the side X, such that the distance corresponds to a side B" of the finished packaging or length of a side M of a packaging insert.

12 Claims, 8 Drawing Sheets

(51) Int. Cl.
  *B31B 50/26* (2017.01)
  *B65B 43/10* (2006.01)
  *B65B 43/52* (2006.01)
  *B65B 5/02* (2006.01)
  *B65B 59/00* (2006.01)
  *B65D 5/18* (2006.01)
  *B65D 5/48* (2006.01)
  *B65D 5/54* (2006.01)
  *B31B 50/62* (2017.01)
  *B31B 50/06* (2017.01)
  *B31B 100/00* (2017.01)
  *B31B 110/35* (2017.01)
  *B31B 120/10* (2017.01)
  *B31B 120/00* (2017.01)

(52) U.S. Cl.
  CPC ............. *B65B 43/10* (2013.01); *B65B 43/52* (2013.01); *B65B 59/001* (2019.05); *B65B 59/003* (2019.05); *B65D 5/18* (2013.01); *B65D 5/48002* (2013.01); *B65D 5/546* (2013.01); *B31B 50/06* (2017.08); *B31B 50/62* (2017.08); *B31B 2100/0024* (2017.08); *B31B 2110/35* (2017.08); *B31B 2120/004* (2017.08); *B31B 2120/102* (2017.08)

(56) References Cited

U.S. PATENT DOCUMENTS

| | | |
|---|---|---|
| 2010/0064636 A1 | 3/2010 | Ford |
| 2010/0181311 A1* | 7/2010 | Costecalde ........... B65D 5/2095 220/7 |
| 2015/0027086 A1* | 1/2015 | Adams .................... B65B 5/024 53/410 |
| 2015/0197364 A1* | 7/2015 | Sytema ................. B65D 5/2052 229/181 |
| 2015/0224731 A1* | 8/2015 | Ponti ....................... B65B 57/12 493/59 |
| 2015/0360433 A1* | 12/2015 | Feijen .................... B31B 50/74 53/456 |
| 2015/0360801 A1* | 12/2015 | Sytema ................... B65B 43/10 53/74 |
| 2016/0021928 A1* | 1/2016 | Fath ...................... B65D 5/2009 53/458 |
| 2016/0236811 A1* | 8/2016 | Jensen ................... B65D 5/445 |

FOREIGN PATENT DOCUMENTS

| | | |
|---|---|---|
| EP | 0 172 133 A1 | 2/1986 |
| EP | 2 692 653 A1 | 2/2014 |
| EP | 3 093 246 A1 | 11/2016 |
| FR | 2 411 134 A1 | 7/1979 |
| FR | 2 776 621 A1 | 10/1999 |
| FR | 2 861 370 A1 | 4/2005 |
| GB | 800 459 A | 8/1958 |
| GB | 2 255 768 A | 11/1992 |
| WO | 2008/152344 A1 | 12/2008 |
| WO | 2014/033635 A1 | 3/2014 |
| WO | 2016/014679 A1 | 1/2016 |

\* cited by examiner

INDIVIDUALIZED PACKAGING

FIELD OF THE INVENTION

The present invention relates to a method for producing a reusable packaging, a packaging, a method for packaging an article, a packaging system, and a blank.

TECHNICAL BACKGROUND

Various methods for largely automated production of cartons adapted specifically to the dimensions of the articles that are to be packaged are known from the prior art. For example U.S. Pat. No. 7,647,752 B2 describes an apparatus for producing customised cartons, comprising a system for determining the dimensions of an object to be packaged, wherein the system communicates via a computer interface with a cartoning machine, such that the apparatus may produce a carton in which the object fits accurately. There, however, only single cartons with or without overlapping top flaps are described. Such cartons, usually have to be reinforced using circumferential adhesive tapes and/or stuffed with filling material so as to ensure safe transport of sensitive articles, since the inherent stability of the carton is low and the adaptation of the interior to the contours of the article is very limited. In addition, such cartons have a polygonal, for example cross-shaped blank assembled from a number of rectangles, which blank results in a high proportion of waste.

More complex packagings, as are known for example from EP 172133 A1, also have a similar, for example substantially cross-shaped blank of the carton material. Inserts for receiving/holding the article(s) in the packaging are manufactured here from a separate carton and for their part must be inserted additionally into the packaging, which in the case of automated production complicates the coordination of the material flow.

The object of the present invention is therefore to avoid the disadvantages of the prior art and to describe a method for producing an individualised packaging adapted to the article(s) in question, which method is easily automatable, and also a packaging and a blank forming the basis of the packaging, which are particularly suitable for a corresponding automated method. The objective is to enable production that produces no waste or only negligible waste due to the construction of the blank or the packaging. Furthermore, in order to simplify the production process, the entire packaging, also with insert(s) as necessary, should be produced only from a single rectangular blank. A further object of the invention is to describe a method for packaging an article by means of a corresponding packaging.

DISCLOSURE

The claimed inventive method is characterised in that firstly a main rectangular blank BZ having sides X and Y and a total area xy is provided and $$2(a+h) \leq x \leq 3(a+h)+a$$

and $$y-2(h+r) \leq b \leq y.$$

Here, a and b correspond to the side dimensions of the footprint area, h corresponds to the height, and r corresponds to the width ($r_s$), or the width reduced by the height h ($r_s-h$), of a periphery region R of the finished packaging. Folding lines B in the main blank are then formed parallel to a first side Y at least at the following distances from the latter:

$B_1$: $a_1=h$, whereby a first side of the packaging is defined;
$B_2$: $a_2=h+a$, whereby a first footprint area is defined;
$B_3$: $a_3=2h+a$, whereby a second side is defined and if $x=2(a+h)$ the second footprint area is defined.

Furthermore, by virtue of the severing of at least two severing lines T, which are preferably arranged side-symmetrically with respect to an axis of symmetry $S_1$ parallel to the side X and each start from opposite sides X of the main blank BZ, along at least one of the folding lines B or the extension thereof, the distance between those two end points $E_T$ f the severing lines T which are closer to $S_1$ is selected such that the distance corresponds to the length of a side B″ of the finished packaging or the length of a side M of a packaging insert. Here, the portions in question, that is to say for example side and footprint area or insert(s) and side remain connected to one another or to the rest of the main blank, movably by folding, over a length $$m=y-2(h+r)$$

of the folding lines, wherein r specifies either the periphery region R itself, which is characterised by a protrusion beyond the side and footprint areas of the packaging, or specifies the periphery region reduced by the height h.

The length t of the severing lines T may be set here in a range $h \leq t < y/2$, particularly preferably at $t=t+h$.

At least one folding line B, which lies on a common straight line with two severing lines, may be formed here only in the region between two severing lines T extending the folding line B.

The method may comprise not only the production of the folding lines $B_1$ to $B_3$, but also the production of one or more of the following folding lines B of the main blank parallel to a first side Y at the following distances from the latter:

$B_4$: $a_4=2(h+a)$, whereby a side delimiting the insert (see for example also FIG. 2) or a side overlapping entirely or only partially with the associated side wall and configured for example as a closure tab may be formed (see for example also FIG. 3A);

$B_5$: $a_5=2(h+a)+h$, whereby, in each case in conjunction with $B_4$, either the insert or a third, overlapping footprint area configured for example as a closure tab may be formed;

$B_0$: $a_0=0$, in this case a footprint area for example may be formed as a further closure tab, which for example extends in a negative direction, i.e. downwardly, by the value a or smaller, for example in relation to the folding line $B_0$ as side Y of the main blank in FIGS. 1 and 3. In this case: $3(a+h)<x \leq 3(a+h)+a$.

Furthermore, at least one perforation line may be provided in the region of the at least one closure tab, parallel to and/or on the folding line, and may extend here substantially from one side a to the opposite side a of the packaging, such that at least part of the closure tab may be separated or detached. This may be implemented, for example, by providing two substantially parallel perforation lines, which form a tear-off tab, wherein the lines can be arranged in a herringbone pattern. A combination with at least one corresponding further, single perforation line may also be advantageous, as described in detail further below.

Hereinafter, for the purpose of greater clarity, instead of the term "footprint area", the terms "bottom" and "top" will also sometimes be used for the footprint areas forming the bottom and top respectively of the packaging. Instead of the term "side", the terms "front side wall" and "rear side wall" (side connected to the top movably by folding) will also be used, and "inner side walls" will be used for the side walls offset to the rear by r or by r+h in the periphery region. The distance of the inner side walls from the associated side a will sometimes be referred to in all embodiments by $r_s$ by way of simplification. For the embodiment described directly hereinafter, $r_s$=r+h, but, for the further embodiment described further below, $r_s$=r.

In one embodiment of the method an insert E which is a terminal insert in relation to the side X may be severed from a side adjacent thereto, i.e. a portion of the dimension h in the X direction and of the dimension y in the Y direction, by virtue of the severing of at least two, preferably side-symmetrical, severing lines $T_5$ (or $T_0$, not shown here), in each case starting from opposite sides X, along one of the folding lines $B_5$, $B_0$, or extending one of these folding lines, such that the distance between the two inner end points ET of the severing lines T corresponds to the length m of a side M of the insert. The folding line $B_5$ may have a distance $a_5$=h+2 (h+a) from the first side Y, or from $B_0$. The insert thus remains connected to the rest of the main blank, movably by folding, in the central region of the folding line $B_5$ or $B_0$ (not shown here in greater detail).

Here, an insert is understood fundamentally to mean an internal partitioning or internal division of the packaging, the size and dimensions of which can be produced in accordance with the dimensions of the item(s) to be packaged. Inserts according to the invention are cut to size from the main blank BZ and folded and are connected, movably by folding, to the rest of the packaging prior to gluing. On the one hand a packaging and insert can thus be produced in the same cartoning machine, practically without producing any waste, and on the other hand the insert E additionally glued in place, for example by means of hot glue, as well as the provision of a protruding periphery region R contribute significantly to the stability of packagings produced in this way.

An insert according to the invention can be folded out in a rectangle, wherein the second side length of the insert corresponds substantially to the side dimension a of the footprint area of the finished packaging.

Here, folding lines A on the main blank can be produced in the region of the insert parallel to both sides X, in each case at the following distances from the corresponding side lines:

$A_1(A_1')$=r, whereby a bottom width tab is defined;
$A_2(A_2')$=r+h=$r_s$, whereby two inner side walls, i.e. offset inwardly by the distance $r_s$, and the outer dimensions of the insert in the XY plane are defined, and an article receptacle is provided in a central region $B_M$ of the insert. The outer dimensions of the region in relation to the XY plane may be $B_M$=m×a, wherein m=y−2(r+h). The provisioning of the article receptacle can comprise at least one of the following operations:

forming at least one further severing line T;
forming at least one further folding line A, B;
forming at least one cut-out C. For example with star-shaped cutting or perforation lines $c_1 \ldots c_n$ in order to hold in a clamped manner an article having outer dimensions slightly larger in relation to the cut-out C.

The provisioning of the article holder in the region the insert may comprise the following steps:

producing folding lines of length n=m−2o=y−2(r+h+o) parallel and centrally to the side Y' delimiting the insert at the following distances from the latter:
$B_6$=a−j
$B_7$=a−(j+h)
$B_7'$=j+h
$B_6'$=j wherein o is the distance between the folding lines $A_2$, $A_2'$ parallel to the side X, or the outer periphery (along $A_2$, $A_2'$) formed thereby and an inner periphery, for example parallel thereto, of the insert (along the adjacent cutting line $T_7$), wherein the inner periphery may be formed by the edge of an inner periphery region or the edge of a top tab forming the inner periphery, j is the distance between Y, Y' or the folding line $B_5$ parallel to the side Y, Y' and a further inner periphery, for example parallel thereto, of the insert, and (j+h+k)=a/2 is the distance from the centre of the insert from the sides Y, Y' and $B_5$;

forming a severing line $T_6$ in a region of the insert that is a central region in relation to the side a, moreover preferably with a length n parallel and central to the side Y, at a distance $t_6$=a/2=j+h+k from Y, Y';
forming two severing lines $T_7$ between opposite folding lines $A_2$, $A_2'$ and the axis of symmetry $S_1$, moreover preferably with a length p=2(h+k)=(a=2j) in parallel and centrally, at a distance $t_7$=r+h+o=(t−n)/2 from the corresponding portion of the X' side associated with the insert.

In addition, a severing line $T_8$, $T_8'$ may be formed as far as the folding line $A_2$ at least in a one-sided, same-sided extension of the folding lines $B_6$ and $B_6'$ respectively, whereby it is thus possible to form one inner flap, movable by folding, or two opposite flaps, movable ray folding, of the finished packaging. By way of the inner flap(s) folded down and forming a periphery, an inserted article can thus be prevented from falling out as the packaging is opened, which would be undesirable, and the articles in addition are fixed in the packaging during shipping.

In the present embodiment the length o the side X of the main blank may lie in the following range:

$$2(h+a)+a \leq x \leq 3(a+h)+a$$

Here the length, in this case the height h between the folding lines $B_5$ and $B_4$ and/or the folding lines $B_6$ ($B_6'$) and/or $B_7$ ($B_7'$) and the lengths a of the insert may be corrected by once to many times the thickness (d) of the carton (folding or bending allowances).

Packaging dimensions of the closed packaging for this embodiment lie preferably in a range (in each case a×b×h) of from 60×60×8 mm to (inclusive) 353×250×100 mm, or preferably from 75×300×8 mm to 300×600×100 mm, with an insert of preferably 60×60×8 to 250×360×100 mm, whereby dimensions for the content, or an individual article of from 45×30×8 mm to 250×353×100 mm result. The main blank BZ for the dimensions x, y lies here in a range of from 600×300 mm to (inclusive) 1200×600 mm, or preferably from 250×300 mm to (inclusive) 1200×600 mm. A 1.5 mm E-flute corrugated board covered on both sides was used.

In a further embodiment of the method the folding lines A of the main blank are produced parallel to a first side X at the following distances from the latter:

$A_1''$: $b_1$=h
$A_2''$: $b_2$=h+r, wherein in this embodiment r=$r_s$ is the periphery width of a protective periphery of the packaging;
$A_3'$: $b_3$=y−(h+r)
$A_4'$: $b_4$=y−h and by virtue of the severing of at least four severing lines $T_3''$, $T_4''$, which are arranged oppositely in pairs and each start from opposite sides X, along at least one of the folding lines B, the distance between those two severing line end points $E_T$ which are closer to an axis of symmetry $S_1$, which is parallel to the side X, corresponds to the length b" of a side B" of the finished packaging and at least four angled cuts $T_1''/T_5'$, $T_2''/T_6''$, which are arranged in pairs on opposite sides of the axis of symmetry, are formed along areas formed by folding lines A, B with sides of lengths h and r or and h.

These adjacent areas form adhesive tabs on a Y side or jointly with the severing lines $T_3''$ and associated folding lines $A_2''$ or $A_3''$ and $B_1$ or $B_2$, which adhesive tab, in the case of the adhesive tabs 45'' of dimension h connected to the sides movably by folding, is glued to the front or rear side wall 33'. To this end, after the folding and cutting operations, the side walls parallel to the X side are firstly folded inwardly through 180° at the lines $A_2''$ and $A_3''$ and upwardly through 90° along the lines $A_1''$ and $A_4''$. As required, this position can be achieved by gluing the areas folded through 180° to the bottom or the top. Subsequently or at the same time, the adhesive tabs 33'' or 45'' can be folded inwardly. The adhesive tabs 33'' connected, movably by folding, to the front or rear side wall 31' or 33' are glued here to the corresponding side tab itself.

These glued connections, in addition to the formation of the periphery region R' with side wall offset inwardly by r, contribute to the mechanical stability of the packaging and can be provided as above with hot glue, or alternatively also with double-sided adhesive strips or other suitable adhesives. Alternatively, in all embodiments, for example with the provision of insert slits in the sides and corresponding matched shaping of the folding tabs, it is also possible to provide a connection and strengthening of the packaging by corresponding mechanical connections.

The angled cuts can be provided here in a region between $B_0$ (or Y) and $B_1$, between $B_2$ and $B_3$ and/or between $B_4$ and/or $B_5$ and in a region between $A_1''$ and $A_2''$ and between $A_3''$ and $A_4''$.

The length of the side X of the main blank in this embodiment may be selected in the following range: $2(a+h) \leq x \leq 3(a+h)$.

Packaging dimensions of the closed packaging in this embodiment lie preferably in a range (in each case a×b×h) of from 210×150×50 mm to (inclusive) 700×400×400 mm, or preferably from 150×210×20 mm to (inclusive) 400×660×300 mm. Main blanks BZ have the same dimensions or larger dimensions, for example thickness increased to 3 mm, and x, y in similar ratio to the first embodiment or preferably from 360×350 mm to 1830×1320 mm. This results in a packaging content of from 150×100×20 mm to at most 400×600×300 mm.

The present invention thus comprises packagings in a range of from 60×60×8 mm to (inclusive) 700×400×400 mm, preferably from a minimum of 75×210×8 mm to at most 400×660×300 mm.

By virtue of the design according to the invention of the packagings, identical main blanks can be used within a certain spectrum of dimensions for a very wide range of dimensions of articles to be packaged.

In all embodiments of the invention, folding lines can be produced by grooving and/or by perforation.

The height h and/or at least one dimension a can be corrected by once to many times the thickness d (folding or bending allowances), in particular shortened, for example in the case of the dimensions of the insert, or can be lengthened, for example in the case of dimensions of the bottom, the lid and/or an adhesive tab formed as a side.

In any case, the carton can be constructed from the blank such that an article can be inserted. The packaging produced from the carton is thus inherently stable, i.e. it retains its shape also in the unclosed or open state by virtue of the special construction method and rigidification or reinforcement by means of glued connections or mechanical interleaving (for example plug-in connections or clamped connections for example by folding or inserting two or more carton tabs one into the other) as described above or other mechanical fastening means, for example clips, seams or the like. Such a packaging can also be produced in advance, stored, and retrieved as required.

A further object of the invention is to provide a packaging according to the invention. Such packaging is produced from a main blank BZ of a carton by grooving and and/or linear perforation, by forming cutting lines, by folding along the groovings and/or perforations, and by the use of fastening means, for example glued connections or mechanical fastening means. The packaging, at least in the closed state, is mechanically reinforced at least in respect of two side walls (31, 31', 33, 33') and parallel or perpendicularly thereto by two further support walls (42, 34'''). The support walls (42, 34''') are likewise produced from the main blank, in each case by virtue of the severing of at least two severing lines T ($T_5$, $T_6$, $T_7$, $T_8$, $T_8'$, $T_3''$, $T_4''$) and by folding along at least one, preferably at least two folding lines B ($B_6$, $B_6'$, $B_7$, $B_7'$), and are connected to the rest of the packaging (30, 30') via at least one folding line each A, B ($B_6$, $B_6'$, $B_7$, $B_7'$, $A_2$, $A_2'$, $A_1''$, $A_2''$, $A_3''$, $A_4''$). By virtue of the complete production of the packaging from the main blank BZ, the packaging can also be stored temporarily following the forming of the necessary groovings A, B and/or perforation lines A, B and the corresponding severing lines T and can be later constructed by folding and additionally connected (mechanically or preferably by gluing). Groovings A, B and/or perforation lines A, B are interchangeable in principle. Perforation lines A, B can be produced for example by one-sided perforation of a corrugated board used for the basic carton, wherein only one cover sheet of the corrugated board, which for example is covered on both sides, is perforated. Suitable corrugated board dimensions, depending on the application or size of the packaging, are between 0.8 and 2.5 mm, or 3.5 mm thickness, preferably between 1 and 2 mm, or 3 mm, for example 1.5 or 3 mm corrugated board with E-flute or double E- or B-flute.

Such a packaging is substantially cuboidal, wherein each two opposite sides with dimensions a or h have a circumferential periphery edge $R_K$ of a periphery region R and a side offset inwardly relative thereto by a distance $r_s = r+h$ or $r_s = r$.

The design of the packaging according to the invention allows optimal article or product protection by virtue of the circumferential periphery edge.

Such a packaging can be produced by any method as disclosed above, for example in an automated manner by means of a cartoning machine as described hereinafter. By virtue of the simple structure and handling, the packaging is suitable particularly for assemblies that require a high flexibility and individualisation, since merely one carton blank BZ is necessary in order to produce a packaging. Such a main blank BZ can be printed in the simplest manner prior to the forming of the cutting lines, grooving lines and perforation lines. Both the main blank, i.e. the finished grooved/perforated and cut carton blank, and the erected packaging can be easily stored temporarily and later used subsequently for construction of the packaging or for a partially or fully automated packing process.

Further embodiments of the packaging are detailed on the one hand in the above-described method for producing the packaging and on the other hand will be described in the description of the figures. Unless clearly absurd to a person skilled in the art, individual or all features described for an embodiment can also be combined with those of any other embodiment and are thus considered to be disclosed in the sense of the invention. This is true not only for the combination of packaging features, but also for the combination of features of the different above-described and below-described method variants, and also in relation to the packaging system.

A further object of the invention is to provide a method for packaging an article by means of a packaging as described above. Such a method comprises the following steps:

Detecting further article information of the article, such as geometry, measurements, dimensions, etc., during the transport of the article to an insertion station and processing of the detected information by a computer interface in order to:
  determine the dimensions a, b, h and $r_s$ of the packaging suitable for the particular article size; wherein a, b and h correspond to the geometric outer dimensions, determined by the article dimension of a cuboid packaging and $r_s$ corresponds to a corresponding periphery region R protruding on two opposite sides of the length a and height h for protection of the packaging content;
  select a main blank XY dimensioned suitably for this purpose with side lengths x and y or produce same from a carton strip and feed it to a cartoning machine;
  automatically adjust and/or actuate the cartoning machine in order to produce the corresponding dimensions (a, b, h, $r_s$) of the packaging from the main blank BZ;
  actuate the cartoning machine or a carton-turning unit arranged between the cartoning machine and insertion station such that the packaging is transferred in an upwardly open state to the insertion station;
  wherein the computer interface controls the carton feed A for selection or production of the main blank, the cartoning machine B and an article transport unit C such that the packaging and article reach the insertion station synchronously and the article can be inserted into the packaging.

Articles having a wide range of dimensions can thus processed in any order (individually, batch size 1).

The article information and/or further article information can be read from a code provided on the article or with the article. For example, when identifying the article via the article identification, for example by reading a barcode, the article information necessary for production of the packaging, such as shipping address, order number, shipping method, etc., can be obtained or retrieved from a customer order processing system connected to the computer interface, in which system the article identification, order data (shipping address, order number, shipping method, etc.) and, if necessary, further article information, such as geometry and/or dimensions of the article, may be stored.

Alternatively, in order to provide further article information relating to the geometry and/or measurements of the article, spatial dimensions of the article may also firstly be detected and then forwarded to the computer interface, for example jointly or in chronological order with the article identification and/or other article information.

Alternatively or in addition, additional article information, such as shipping address, sender, further product data, etc., can additionally be read from the code.

The article can be inserted by hand or automatically, wherein following insertion of the article the packaging may be closed and removed automatically, for example by means of a removal device E.

Before or whilst the packaging is removed, at least one of the following steps may preferably be performed in a controlled manner automatically, for example by the computer interface:

marking, for example labelling and/or addressing, the packaging;

checking the packaging.

The latter may be combined with an automatic diversion of defective packagings to a reject receptacle F, for example onto a reject belt or into a reject container.

By way of the connection of the computer interface to the customer order processing system, the status regarding the packaged articles can be reported in an automated manner.

The cartoning machine may comprise a plurality of sub-units, such as a carton-transporting unit, which can also be configured as a carton-turning unit, for providing the carton in an upwardly open position and/or for transporting the carton to the insertion station, and also at least two, preferably at least three, folding and/or gluing units.

Blanks may be moved away from the carton feed A and cartoning machine B over a packaging transport path, which extends from unit A at least to unit D, and an article may be moved away from the article-transporting unit C along an article transport path comprising at least the article-transporting unit, in each case intermittently in the direction of the packing station A, in particular to the insertion station 15, and the packaged article is moved away from the insertion station by way of a removal device E along a removal path ZT comprising at least parts of the packing unit D and the removal device E, intermittently or continuously. The cycles can be set by the computer interface depending on the duration of the longest processing step for production of the packaging. For example, also in the case of manual operation of the insertion station, in order to facilitate the process for the operator, the procedure can be interrupted and initiated again at the end of the cycle, for example by a stop switch or by way of a control panel. Alternatively, if the insertion station is also operated in an automated manner by a robot, for example a "pick and place" robot, in particular a Scara robot, this robot may also be actuated preferably likewise by the computer interface.

A particularly simple and therefore economical automatic feed mechanism may be implemented by feeding the contents from the front side, for example by means of conveyor belts, into the packaging, which is not yet in the finished closed state. In this case a side wall which is a front side wall in relation to a packaging transport direction VT is folded into its constructed state and glued, for example in a subsequent folding facility with gluing unit, only once the article has been inserted in the insertion station.

The computer interface may have access to (for control) or may actuate one or more computing units connected thereto, wherein signals from the connected computing units, for example a controller of at least one of the sub-units A to F, may advantageously also be received by the computer interface and processed, for example for synchronisation, rapid shutdown, process logging, etc.

A packaging system for packaging an article, for example by means of a packaging as described above, will be described hereinafter. The packaging system comprises
  an article-transporting unit C, which is arranged before an insertion station 15 in relation to an article transport direction AT;
  an object identifier 14, which is arranged in the region of the article-transporting unit C or directly before or after the article-transporting unit C in relation to the article transport direction AT;
  a carton feed A, which is arranged before the insertion station 15 in relation to a packaging transport direction VT;

a cartoning machine B, which is arranged downstream of the carton feed and before the insertion station (15) in relation to the packaging transport direction VT;

a computer interface, which is connected to the object identifier (14), carton feed A and cartoning machine B and is configured to convert data detected by the object identifier (14) into control signals at least for the carton feed A and cartoning machine B, such that a method as described above for packaging an article can be performed.

The computer interface can be configured, on the basis of the data regarding the dimensions corresponding to the article size, to calculate xy of a substantially rectangular main blank BZ and thus to actuate the carton feed A in order to produce or select a suitable main blank, and to calculate the dimensions a, b, h and $r_s$ of the substantially cuboid packaging and thus actuate the cartoning machine to produce the packaging.

Here as well, a, b and h correspond to the geometric outer dimensions, determined by the article dimensions, of a cuboid packaging and $r_s$ corresponds to a corresponding periphery region protruding on two opposite sides of length a and height h for protection of the packaging content.

The carton feed may advantageously comprise an infeed with at least two feeders so as to be able to retrieve main blanks of different size from the feeders, which blanks are set down at the infeed by the feeders and are oriented before being transferred to the cartoning machine. The main blank may be set down lengthwise in relation to the packaging transport direction VT in relation to the corrugation direction of the blank, i.e. corrugation valleys and corrugation crests transversely thereto, or transversely relative to the packaging transport direction VT in relation to the corrugation direction, i.e. corrugation valleys and corrugations crests lengthwise relative thereto. In embodiments with inserts the corrugation direction may preferably be transverse, with corrugation valleys parallel to X. In embodiments without inserts the corrugation direction may preferably be lengthwise with corrugation valleys parallel to Y.

For embodiments with inserts, the folding lines $A_n$ are then firstly shaped in a longitudinal processing step in a longitudinal processing station, followed by a shaping of the folding lines $B_n$ in a transverse processing step in a transverse processing station. For embodiments without inserts, the corresponding folding lines $A_n$ and $B_n$ may be produced in the reverse order. A reversal of the order is also possible in principle in both cases. In any case, the necessary longitudinal or transverse and severing cuts $T_n$ may be made simultaneously.

The object identifier may comprise a code reader and/or optical 3D recognition.

Alternatively, the system may also be operated without the object identifier of the articles to be packaged. In this case, the packaging dimension to be produced may be selected by the operator by way of a formula stored in the computer interface and may be produced as required.

The cartoning machine may comprise a longitudinal processing station (4) with adjustable cutting, grooving and/or perforation tools and a transverse processing station (5) with adjustable cutting, grooving and/or perforation tools. Longitudinal and transverse processing stations are configured here such that they may form folding, perforation or severing lines at right angles to one another on the main blank. Firstly, all parallel lines ($A_{1-n}$) of one direction advantageously are formed, followed by all parallel lines ($B_{1-n}$) of a direction perpendicular thereto, or vice versa. One or more folding facilities, in this case preferably at least two and particularly preferably at least three folding facilities, are arranged downstream of the longitudinal processing station and downstream of the transverse processing station.

At least one folding facility may comprise a controllable application device for adhesive, for example a melting apparatus 11 and nozzle for hot glue or adhesives and adhesive means as described above.

A carton-turning unit may be arranged between the cartoning machine B and insertion station in order to set down the carton in the open state at the insertion station, with the front side facing the operator or insertion robot. Furthermore, a removal device E may be arranged downstream of the insertion station. This removal device or the packing unit D itself may comprise a marking and/or a checking unit.

In one embodiment of a packaging system according to the invention at least the units A to D, preferably at least the units A to E of the system may be actuated, in particular synchronised, by the computer interface directly or via computing units connected in between. A manual input device (12) may be connected to the computer interface at the insertion station (15) in order to additionally forward to the computer interface a stop-start command or in particular a manual cycle-time setting for synchronisation. The input device may be configured as a manual switch or as a control panel, or in particular as a foot switch so that the operator may keep his hands free.

LISTS OF REFERENCE SIGNS

With regard to FIGS. 1-3B: dimension arrows are shown with open arrowheads, folding arrows are shown with closed, bold arrowheads. Here, a straight folding arrow means folding of the region with the arrow base through 180° about the folding line, two arrows extending at an angle from the folding line mean folding through 90°, wherein two 90° folds next to one another can be made in a Z shape or U shape. Folds along the folding lines $B_0$ to $B_5$ are always made in a U shape.

List of reference signs I, FIGS. 1-3B

| | |
|---|---|
| XY | main blank |
| Xy | footprint area of the main blank |
| $R_K$ | periphery edge |
| m | side length of the insert parallel to the Y side, along folding line B |
| $S_1$ | axis of symmetry |
| X | longitudinal side of the main blank |
| x, x', x" | length of X |
| Y | first side/transverse side of the main blank |
| y, y', y" | length of Y |
| x · y | total area of the main blank |
| a | side dimension of the side A of the finished packaging |
| $a_1, a_2, a_3, \ldots$ | side dimensions/distance (of a folding line B) from the first side Y of the BZ |
| b, b', b" | side dimension of the sides B, B', B" of the finished packaging |
| d | thickness of the carton |
| h | height of the finished packaging |
| $A_1, A_2, A_3, \ldots$ $A_n; A_1', A_2', A_3', \ldots A_n'$ | folding lines of the main blank parallel to the X side |
| $B_1, B_2, B_3, \ldots$ | folding lines of the main |

-continued

| | |
|---|---|
| $B_n$; $B_1'$, $B_2'$, $B_3'$, ... $B'_n$ | blank parallel to the first side Y |
| $B_M$ | central region of the insert |
| C; $C_1$, $C_2$, $C_3$ ... | further severing or perforation lines |
| T; $T_1$, $T_2$, $T_3$, ... ; $T_1'$, $T_2'$, $T_3'$, ... ; $T_1''$, $T_2''$, $T_3''$, ... | severing lines |
| $t_1$, $t_2$, $t_3$, ... | length of a severing line |
| $E_T$ | (inner) end point of severing lines T |
| $m = y - 2(r+h) \approx b''$ | length of the side M of the insert, corresponds to the side length b'' of the side B for packagings without insert |
| $r \leq r_s \leq r + h$ | periphery width of a protective periphery of the packaging |
| $j = a/2 - (h+k)$ | distance between $B_5$ or Y' and $B_6$, $B_6'$ |
| $k = a/2 - (h+j)$ | distance between $B_7$ or $B_7'$ and $T_6$ |
| $o = (m-n)/2$ | distance between $A_2$ or $A_2$ and $T_7$ |

List of reference signs II, FIGS. 4-7:

| | |
|---|---|
| 1 | carton feeder |
| 2 | additional carton feeder |
| 3 | infeed/orientation |
| 4 | longitudinal processing (grooving, perforation, cutting) |
| 5 | transverse processing (grooving, perforation, cutting) |
| 6 | folding facility/insert |
| 7 | folding facility, construction/insert |
| 8 | folding facility with gluing station (hot glue)/insert |
| 9 | folding facility/folding insert closed |
| 10 | turning |
| 11 | melting apparatus hot glue |
| 12 | control panel |
| 13 | buffer article feed (option) |
| 14 | object identifier with optional counter, code identifier |
| 15 | insertion station |
| 16 | folding facility/folding packaging closed |
| 17 | gluing station for closing the packaging (hot glue) |
| 18 | closing and labelling station |
| 19 | quality control/closure control/counter (option); for example camera system, sensor |
| 20 | removal belt |
| 22 | further removal belt |
| 22 | operator |
| 30, 30' | packaging |
| 31, 31' | front side wall |
| 32, 32' | bottom |
| 33, 33' | rear side wall |
| 34, 34' | top |
| 34'' | top periphery |
| 34''' | top periphery side |
| 35, 35' | closure tab |
| 33'', 35'', 45'' | adhesive tabs |
| 36 | adhesive strip (hot glue, double-sided adhesive tape, ...) |
| 37 | (tear-off) perforation line |
| 38 | further closure tab |
| 39 | tear-off tab |
| 40 | insert |
| 41 | inner periphery region of the insert (E) |
| 42 | inner delimiting walls of the insert (E) |
| 43 | bottom longitudinal tabs |
| 44 | bottom width tabs |
| 45, 45' | inner side walls |
| 45'' | adhesive tabs |
| 46 | top tab |
| 47 | insertion opening |
| 48, 48' | insertion region |
| A | carton feed |
| B | cartoning machine |
| C | article-transporting unit |
| D | packing unit |
| E | removal device |
| F | reject receptacle |
| AT | article transport direction |
| VT | packaging transport direction |
| ZT | removal path |

BRIEF DESCRIPTION OF THE DRAWINGS

The invention will be described hereinafter by way of example with reference to figures.

FIG. 1 a basic folding schema and blank
FIG. 2 folding schema and blank with insert
FIGS. 3A-3B folding schema and blank without insert
FIG. 4 packaging with insert
FIG. 5 packaging without insert
FIG. 6 closure variant With regard to the reference signs in FIGS. 1-3B, reference is made to list of reference signs I. These figures show folding lines $A_0$-$A_n$, and $B_0$-$B_n$, folding schema and severing cuts T, $T_1$-$T_n$, as are formed on a main blank BZ of dimensions xy in order to produce a packaging according to the invention. Such a main blank prepared for folding is referred to here merely as a blank for the sake of simplicity. Although the following examples will be discussed on the basis of blanks made of cardboard, other material that is suitable in respect of strength and processability, such as thicker paper or plastic films or also appropriate composite materials, etc., can also be used in principle for the production of packagings, as is known to a person skilled in the art. Packagings made of such materials are therefore included by the invention. Dimension arrows are shown with open arrowheads, folding arrows are shown with closed, bold arrowheads. Here, a straight folding arrow means folding of the region with the arrow base through 180° about the folding line, two arrows extending at an angle from the folding line mean folding through 90°, wherein two 90° folds next to one another can be made in a Z shape or U shape, i.e. can be made in the same direction or in opposite directions. The axis of symmetry $S_1$ is shown in FIGS. 1-3B by a dot-and-dash line, possible folding lines are shown by fine dashed lines, folding lines A, B where folds have already been made are shown by fine solid lines, and severing lines T are shown by double solid lines.

Figure 1:
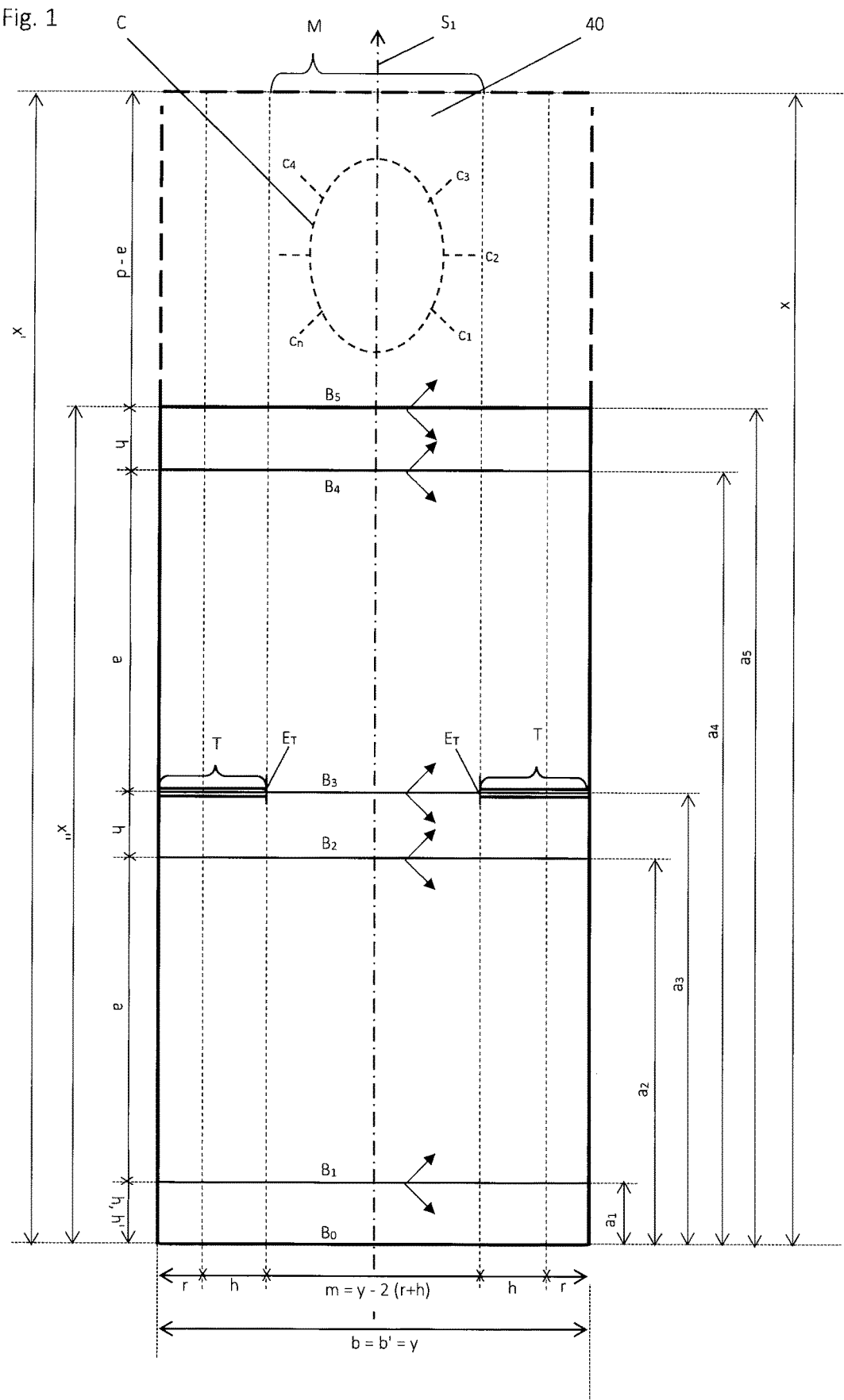
FIGS. 1 to 7 show.

The principle of the features essential to the carton blanks according to the invention and to the method according to the invention will be described here on the basis of FIG. 1. Here, two carton blanks with X sides of different size are shown, for example $x''=2(h+a)+h$ by solid lines and $x'=3(h+a)$, which includes the packaging, extended by the dashed side lines. The folds along the folding lines $B_0$ to $B_5$ are always U-shaped, whereby, in the case of the side length x'', a packaging with two footprint areas of dimensions ab or ab', ab" (bottom 32, 32', top 34, 34'), two side faces of dimensions hb or hb', hb" (front and rear side wall), and a closure tab 35 of the same measurements, for example between lines $B_4$ and $B_5$ or $B_0$ and $B_1$, is formed. In this case $B_5$ and $B_0$ form the Y sides of the main blank. If the main blank BZ is extended by a footprint area at one of the lines $B_0$ or $B_5$ in a corresponding x-direction, a further closure tab 38 or an insert 40 for accommodating/holding at least one item, for example an article to be shipped, can thus be provided, depending on the folding. Here, corresponding cartoning machines for the production of blanks can be easily adapted for different article sizes, since for this purpose, on account of the substantially orthogonal orientation of the processing lines, merely the distances of the grooving, perforation and/or cutting tools, and of the folding tools and gluing positions in a longitudinal and/or transverse processing device have to be adapted. Additionally or alternatively to the folding and severing schema of an insert 40 shown in detail in FIG. 2, cuts C, $C_1$-$C_n$ adapted to specific article measurements can be formed for example in the region of the top tab 46, as shown at the top of FIG. 1, in order to better hold the article or to better present it when the packaging 30 is opened. The top tab 46 may be connected quite generally also fixedly to the inner periphery or inner periphery region 41 of the insert 40, and together therewith may form a circumferential inner periphery or inner periphery region which delimits the insertion opening and which may be easily adapted to specific article dimensions.

Figure 2:
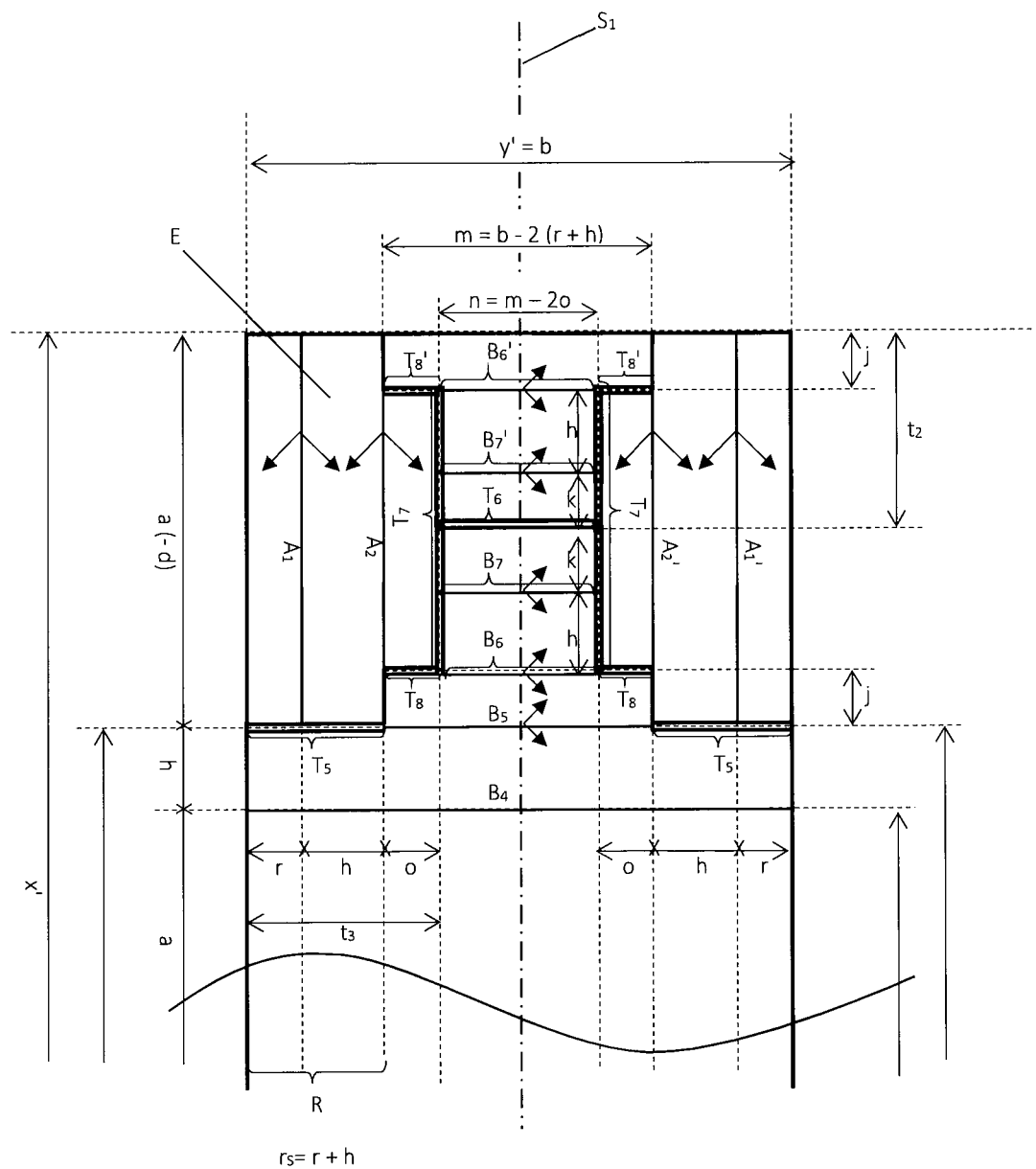

FIG. 2 shows a detail of a carton blank of dimensions x'=3(h+a) and y'=b with an insert. In this embodiment the article receptacle with insertion opening 47 is formed by the insert 40, which is folded out from the carton blank between the line $B_5$ and the shown Y side, which here corresponds to a side dimension b' of the finished packaging of the footprint area. To this end, for example initially along the lines $A_2$, $A_2$', the inner side walls may be raised at right angles with the top tabs and bottom width tabs connected thereto, movably by folding, then the further folds may be made at the insert, and said insert lastly may be folded along the folding line $B_5$ through 90°. The insert is then folded at B4 and B5 in the direction of the bottom 32 (see also FIG. 4). The folding lines $B_4$ to $B_1$, which are continuous from one side X to the opposite side X, are then folded accordingly, and the adhesive tabs are glued. In this regard see also FIG. 4, which is described in greater detail further below and which shows a corresponding packaging in the open state. The protective periphery R protruding beyond the inner side walls 45 in the present case has a depth $r_s$=r+h.

Figure 3A:
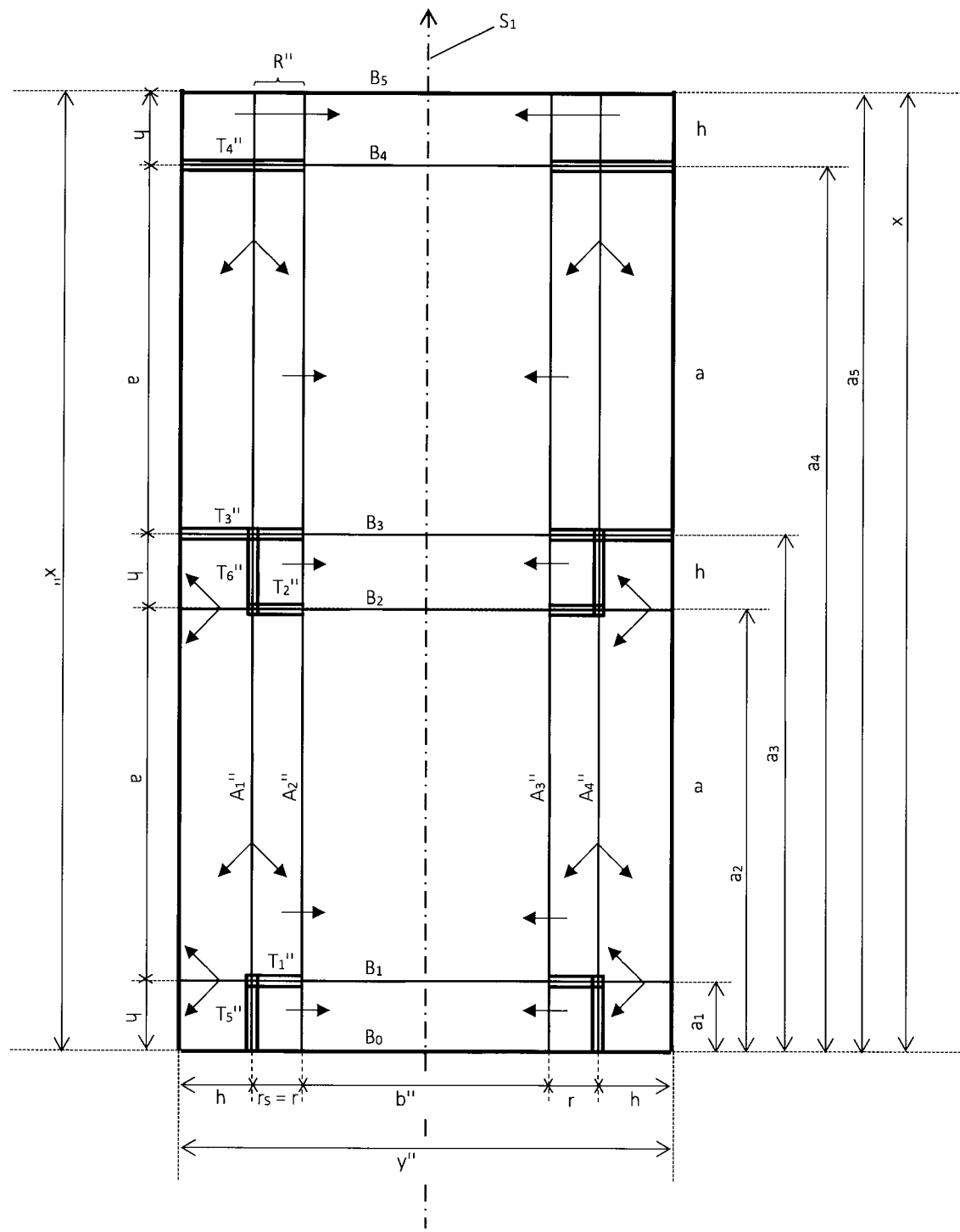
Figure 5:
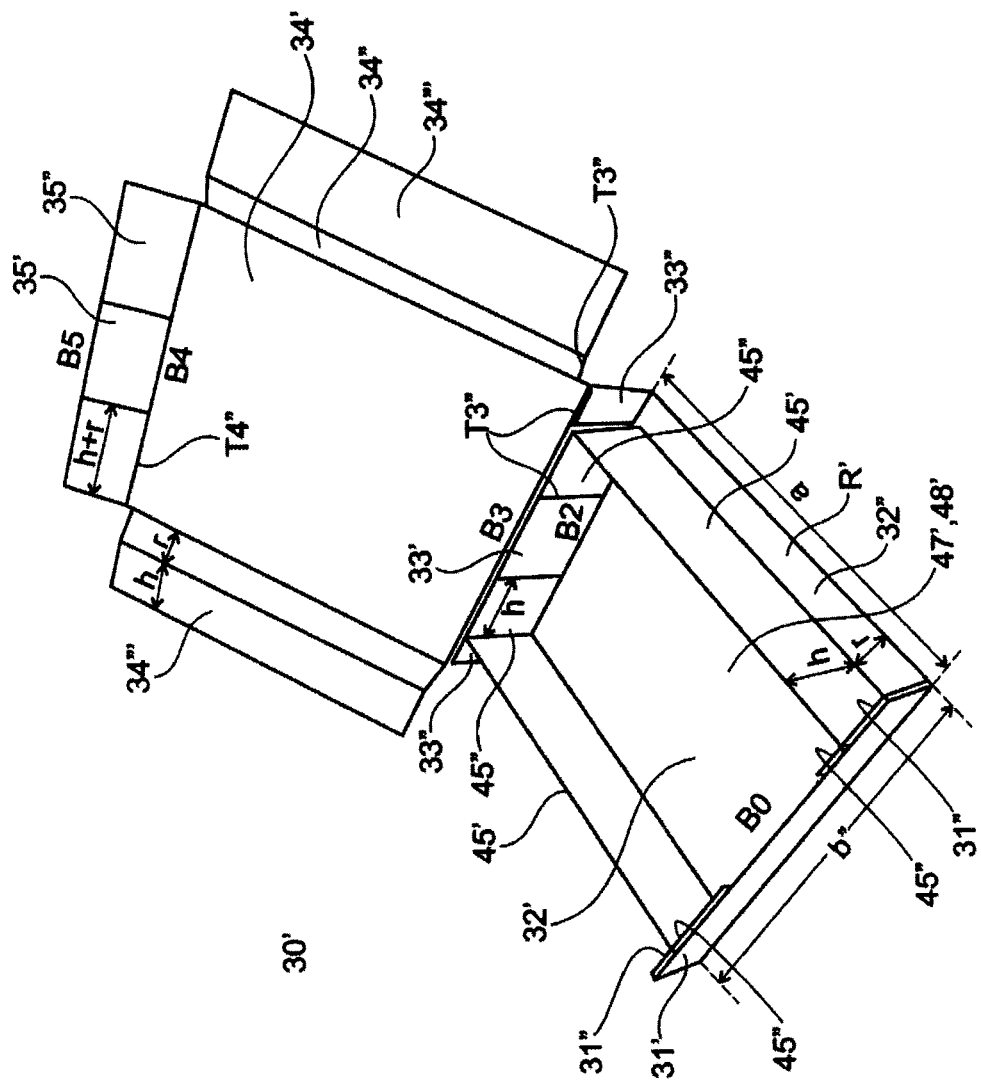

FIG. 3A shows a further carton blank for a second embodiment of a packaging 30', which is shown in FIG. 5, described in greater detail further below, in the folded, but open state. The blank has the X dimension x"=2(a+h)+h. In contrast to the first embodiment, no insert is folded here from a footprint area, and instead additional folds $A_1$-$A_4$ are made parallel to the side X, and different cuts $T_1$"-$T_6$' already described in the disclosure of the invention are made. The adhesive tabs 31", 33", 35" connected, movably by folding, to the sides of the front side wall 31', the rear side wall 33' and the closure tab 35' are folded here in each case through 180° inwardly and are glued to the corresponding side walls themselves, which increases the stability of the side walls. By contrast the adhesive tabs 45" of the inner side walls 45' are folded inwardly merely through 90°, more specifically once the bottom periphery edge 32" has been folded over through 180° and the inner side walls 45' have been folded out from the bottom periphery region through 90°, and are glued to the adjacent rear side wall 33', whereby the insertion region 48' of the packaging 30' is formed.

Figure 3B:
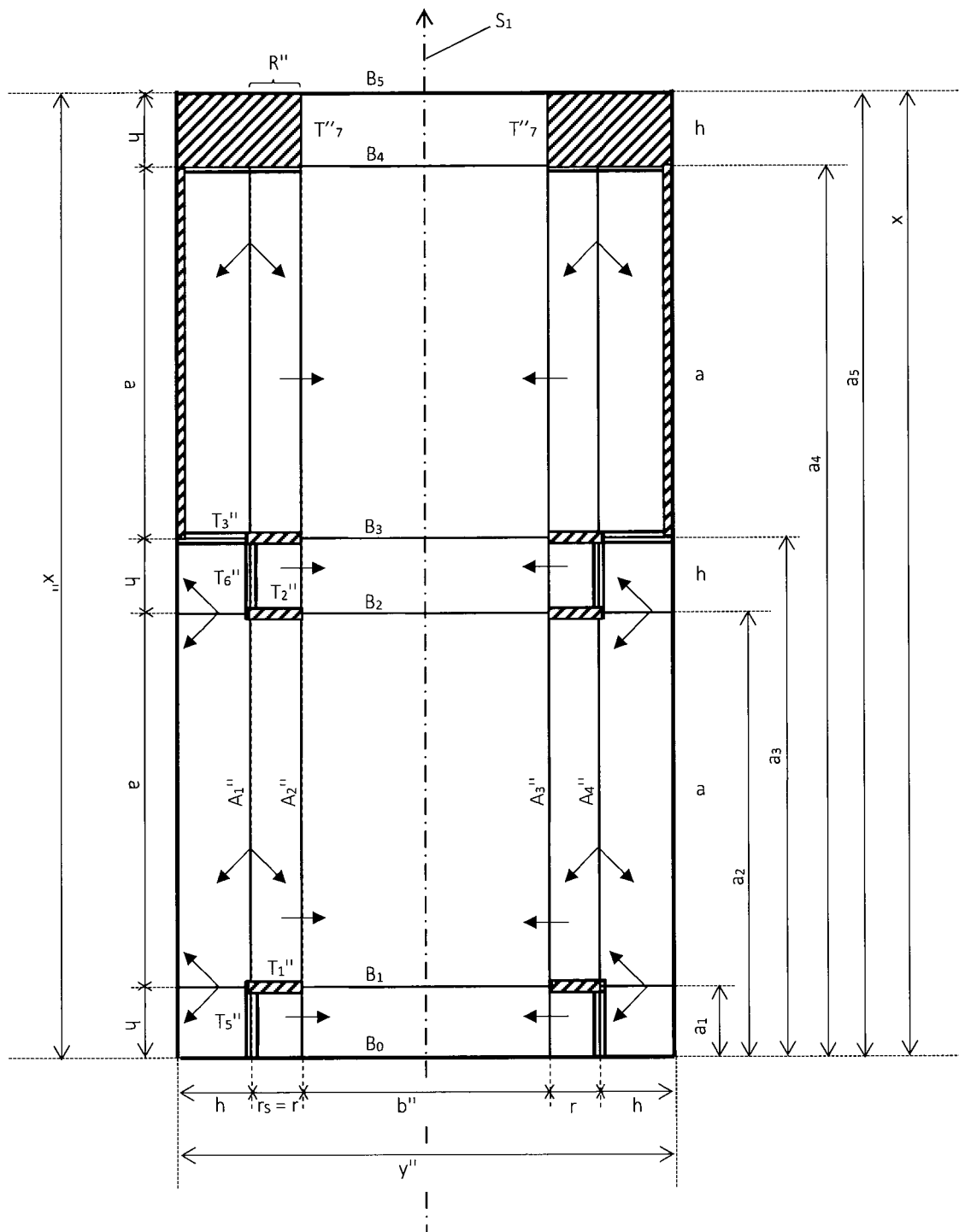

FIG. 3B shows an alternative embodiment of a blank without insert, in which free areas shown by hatching, i.e. regions of the carton where parts of the main blank are trimmed or cut out, are provided. By virtue of these free areas the substantially cuboidal geometry of the packaging can be more clearly defined or shaped, since any crushing in the corners can be avoided and the corresponding right angles can be maintained.

For example, free areas can be provided here in the region of the cuts $T_1$", $T_2$" and $T_3$", in each case in the periphery region between the lines $A_1$" and $A_2$", or between the lines $A_3$" and $A_4$", for example with a length r. The cut-out of the free area in this case has a width of approximately 5 mm (+/−3 mm) and can be produced by a double cut, which is cut transversely from the end, such that a small rectangle is cut out. The other cuts shown in FIG. 3B are simple severing cuts in which the carton is cut in a corner or side region. For example, the tabs 35" with the dimensions h×(h+r) may be trimmed along the separation lines $T_4$" and $T_7$" and/or (additionally) a peripheral cut of length a may be made along the top peripheral side 34'" (width approximately 3 mm for B-flute or double E-flute, or approximately 1.5 mm width for a single E-flute) in order to compensate for the thickness of the periphery R.

With regard to the additional reference signs or those used otherwise in FIGS. 4 to 7, reference is made to list of reference signs II.

Figure 4:
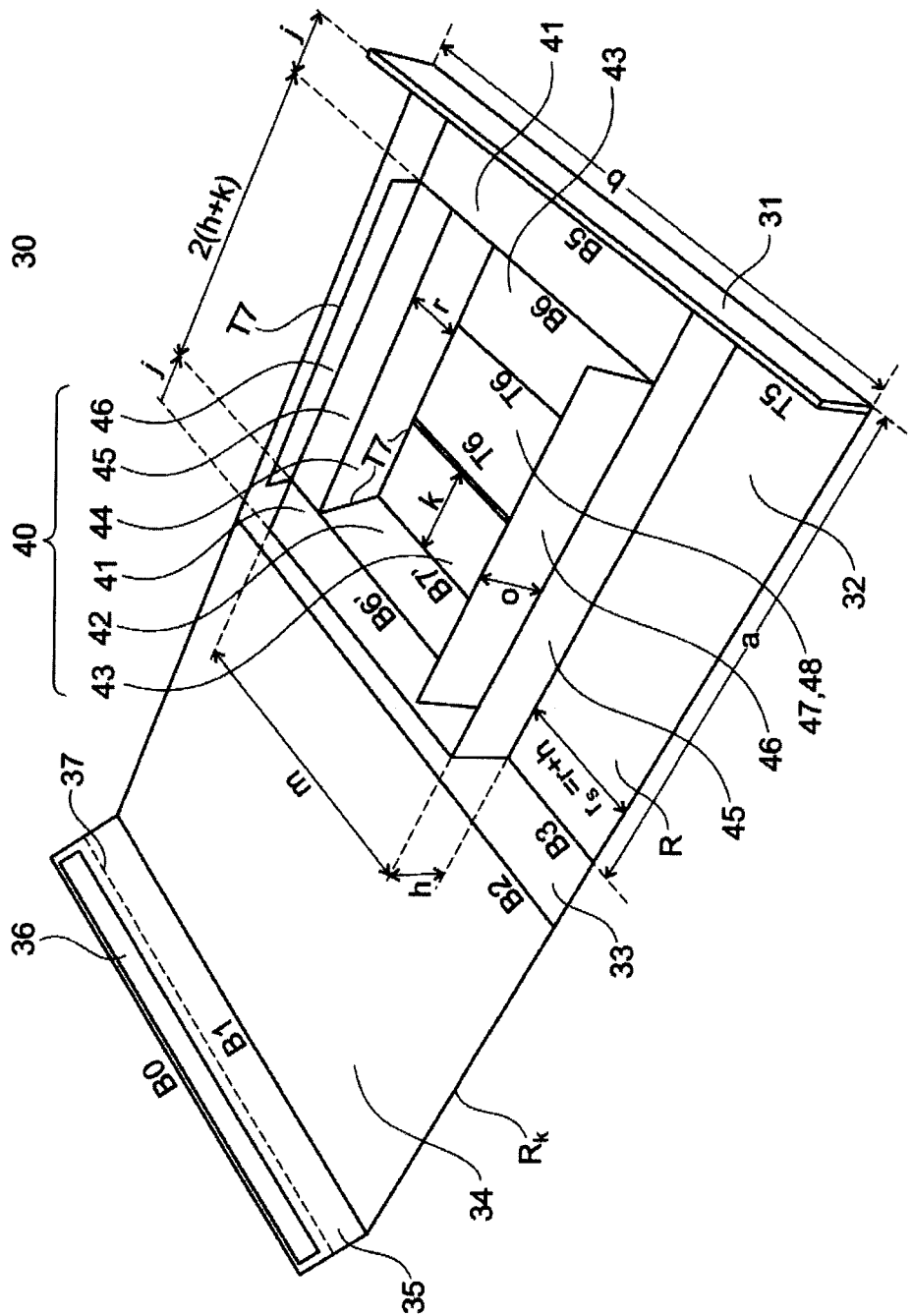

FIG. 4 shows an exemplary packaging which may be produced or constructed by folding from a waste-free carton blank, with folding lines and severing cuts as shown in FIG. 2. The packaging 30 comprises a front side wall 31, a bottom 32, a rear side wall 33, a top 34, and a closure tab 35. The folding lines and cutting lines are referenced similarly to FIGS. 1 and 2, wherein the peripheries adjoining the cutting lines $T_5$, $T_6$, $T_7$ and $T_8$ are now spatially separated from one another on account of the folding, however the references for the various cutting lines will be retained for the purpose of easier orientation. The rear side wall and top with closure tab are in the open position, and therefore for example an individual object may be placed in the packaging, more specifically in the recess 47, which forms an insertion opening of the insert 40. The insert, which is connected via the folding line B5 to the front side wall of the packaging, additionally has been glued here to the bottom 32 of the packaging via a bottom longitudinal tab 43 and a bottom width tab 44. The packaging is thus provided with additional stability. An upper inner periphery or inner periphery region 41 is formed between the front and rear side walls of the packaging and the recess of the insertion opening 47 of the insert 40. Of these, the two opposite, inner delimiting walls 42 of the insertion opening 47 are folded downwardly at a right angle, that is to say in the direction of the bottom 32. These, at the same time, form extra support walls in addition to the side walls 31, 33 parallel thereto in the closed state. The two bottom longitudinal tabs 43 with the width k are in turn folded at a right angle along the bottom from the inner delimiting walls 42, in the present case inwardly, and are glued to the bottom. With regard to the use of the terms "up" and "down", these are used in the manner comprehended as the insertion opening 47, or top 34 in the closed state being "up" and bottom 32 being "down". Here, the term "rear" refers to the side of the packaging to which the top 34 in the open state is connected movably by folding, and "front" refers to the corresponding, opposite side, from which an operator or an automatic handler usually inserts the item into the packaging. In the lower region, the bottom width tab 44 is folded inwardly from the inner side walls 45 extending between the front side wall 31 and rear side wall 33, at a right angle parallel to the bottom 32 and is glued thereto. The top tabs 46 are shown here opened upwardly from the inner side walls 45 in the region of the insertion opening 47. They may be pushed downwardly following insertion of the object that is to be packaged, whereby the object can be prevented from falling out unintentionally during shipping or when the packaging is opened. As can be seen from a comparison of FIG. 4 and FIG. 2, the dimensions of the insertion opening 47 may be varied very easily by appropriate selection of the measurements j, k, o and r within the scope of the overall dimensions a and b of the packaging.

In the present FIG. 4 a double-sided adhesive strip 36 is furthermore attached to the closure tab 35 and may be used to close the packaging once the object that is to be shipped has been inserted and the rear side wall and the top have been folded closed. The receiver may then open the packaging 30 for example along the perforation line 37 and may reuse the same packaging, for example if it is desired to send the object back. This may be made possible in a simple manner for example by providing a further double-sided adhesive strip with tear-off film (not shown here), for example by attaching the further adhesive strip between the perforation line 37 and folding line $B_1$. With regard to the folding direction of the bottom width tab 44 and the bottom longitudinal tab 43, it should be noted that this may also be provided in a direction arranged oppositely through 180°, depending on the selected corresponding dimensions. By virtue of the oversize of the outer dimensions a, b of the packaging in relation to the insert 40, a periphery region R, which is accessible from outside, forms a cavity in accordance with the depth of the periphery region $r_s = r+h$, and is closed off inwardly by the inner side walls 45, is created along the two inner side walls 45 when the packaging 30 is in the closed state. On the one hand, the finished packaging 30 may thus be more easily grasped, and on the other hand this design significantly increases the stability of the packaging, whereby the object deposited in the insert is better protected. Due to the simple manufacture of the packaging, in particular the inner dimensions of the insert 40, it can be tailored ideally to the size of the shipment item, and therefore the item may be inserted flush or even slightly clamped between the walls 42, 45 and/or top tab 46 and bottom longitudinal tab 43 or bottom width tab 44. By virtue of a suitable selection of the position of the folding or cutting lines, articles of quite different geometry (asymmetric, polygonal, round, oval, etc.) may also be received in an ideal manner, for example by way of an inclined position and resilient effect of the side walls 42.

In particular in conjunction with the high stability of the packaging, there is thus no need to use any additional packaging material.

The packaging shown in FIG. 4 is suitable in particular for packing one or more articles as flat as possible, which facilitates delivery of the parcel, for example through a letterbox.

FIG. 5 shows a further embodiment of the present invention, i.e. a packaging 31' producible for example by a method according to the invention. In contrast to the embodiment shown in FIG. 4, which is particularly suitable for the packaging of individual objects, a plurality of objects may also be packaged simultaneously in the present packaging. Folding lines and practically waste-free blank of such a packaging 31', shown here likewise in the open state, are shown in FIG. 3A. The reference signs are thus used analogously, and reference is made to that mentioned for FIG. 4 with regard to the spatial separation of the cutting lines and reference signs.

In the present case the packaging may be constructed by folding starting from the front side wall 31' above the bottom 32', rear side wall 33', top region 34' to 34''' and closure tab 35'. Since the inner side walls 45' in the closed state are additionally reinforced externally by the top periphery sides 34''' positioned or clamped in parallel next to the inner side walls in the periphery region R', the protective periphery region R' offset inwardly may be selected to be smaller. The top periphery 34'' is folded inwardly and downwardly through 180°, and the top periphery side 34''' is in turn folded downwardly from there through 90°, during, before or after the closing of the top by the closure tab 35', for example by means of an adhesive strip on the front side wall 31' or the closure tab 35', similarly to the explanation for FIG. 4. The top periphery side 34''' is thus held in a clamped manner parallel to the inner side wall 45', additionally supported between the bottom edge 32'' and top 34'. The top edge sides 34''' here have the function of additional support walls. For stabilisation of the open packaging as well, various adhesive connections are made, and thus the adhesive tabs 33'' protruding from the front side wall 31' and the rear side wall 33' are each glued by being folded over through 180° against the corresponding side wall 31', 33'. A similar movement is performed with the further adhesive tab 35'' arranged movably by folding on the closure tab 35''. In order to secure the insertion region 48', the side adhesive tabs 45'' secured movably by folding to the inner side walls 45' are connected to the front side wall 31' and the rear side wall 33'. Furthermore, the bottom 32' and bottom periphery 32'' may be glued to one another. In the case of this present packaging 31', it may be advantageous to provide additional filling material or an insert, in this case not connected movably by folding to the actual packaging, in the insertion region 48' for the separation of different objects.

Compared to previously known packagings that can be produced in an automated manner, the packagings according to the invention described here by way of example are characterised by a strength that is largely independent of the object to be inserted or of objects to be inserted and additional inserts and/or filling material. They may thus also be stored readily and retrieved as required, for example in the open or closed state, but not yet glued-shut state.

Figure 6:
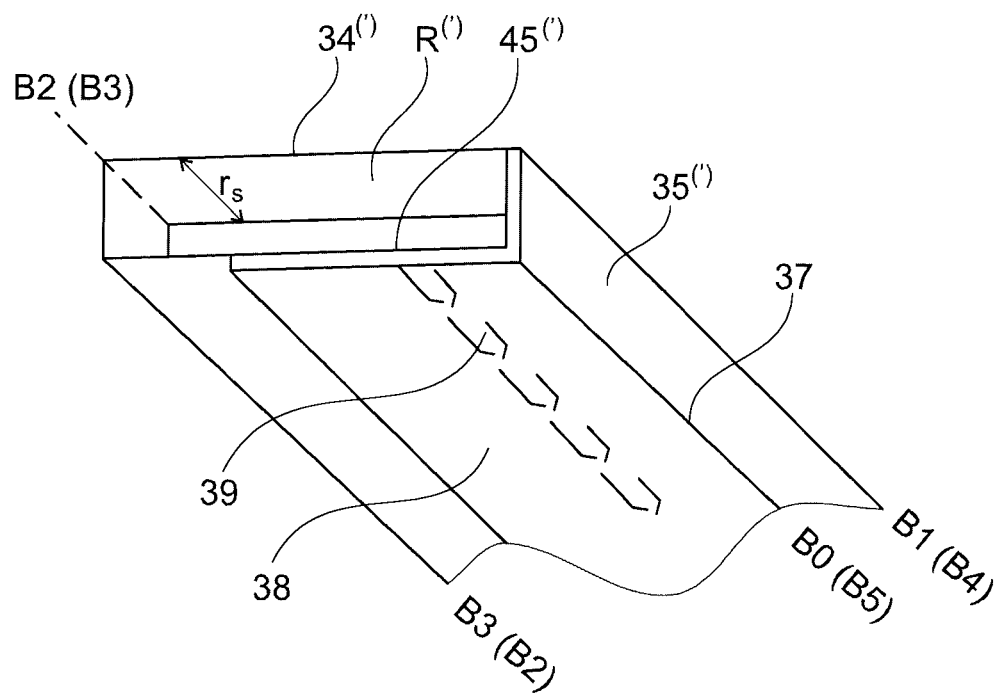
Figure 6:
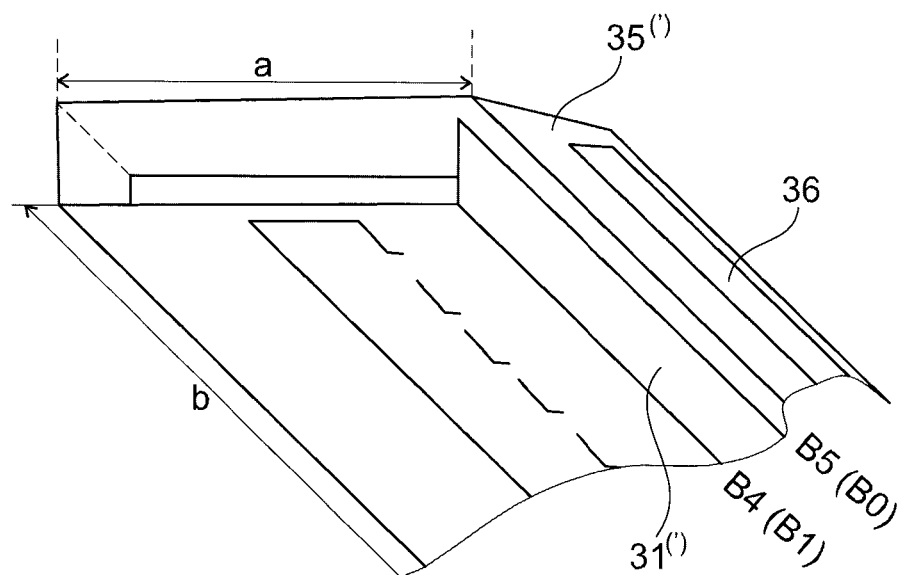

A further closure system, which is usable in principle for all packagings described in accordance with the invention, is shown in detail in FIG. 6. Here, the closure tab 35, 35' is extended in the region of the sides or lines $B_0$, $B_5$ by the length b, b''' by a further closure tab 38 and is connected thereto, movably by folding. The further closure tab in this case may have at most the dimensions of the footprint area of the packaging, that is to say a×b or a×b'''.

The further closure tab 38 is glued to the bottom 32, 32' of the packaging in the region of said closure tab that is the terminal region based on the carton blank, at least in the region of the longer side B, B'''. At the same time, a tear-off tab 39 is provided on the further closure tab 38 and separates the glued region from the unglued region of the further closure tab 38. In the present case the tear-off tab 39 is formed by two perforation lines arranged in a herringbone pattern. A perforation line 37 is provided along the folding line $B_0$, which is situated on the edge formed between the closure tab 35, 35' and further closure tab 38 in the closed state. The receiver can thus open the packaging with the aid of the tear-off tab 39 particularly easily, and can tear off the residues of the further closure tab 38 along the perforation 37. Should the parcel have to be sent back, an adhesive strip 36 covered with a tear-off film (not shown here) is provided on the inner side of the closure tab 35, 35' and can be used by the receiver for further use of the packaging.

Figure 7:
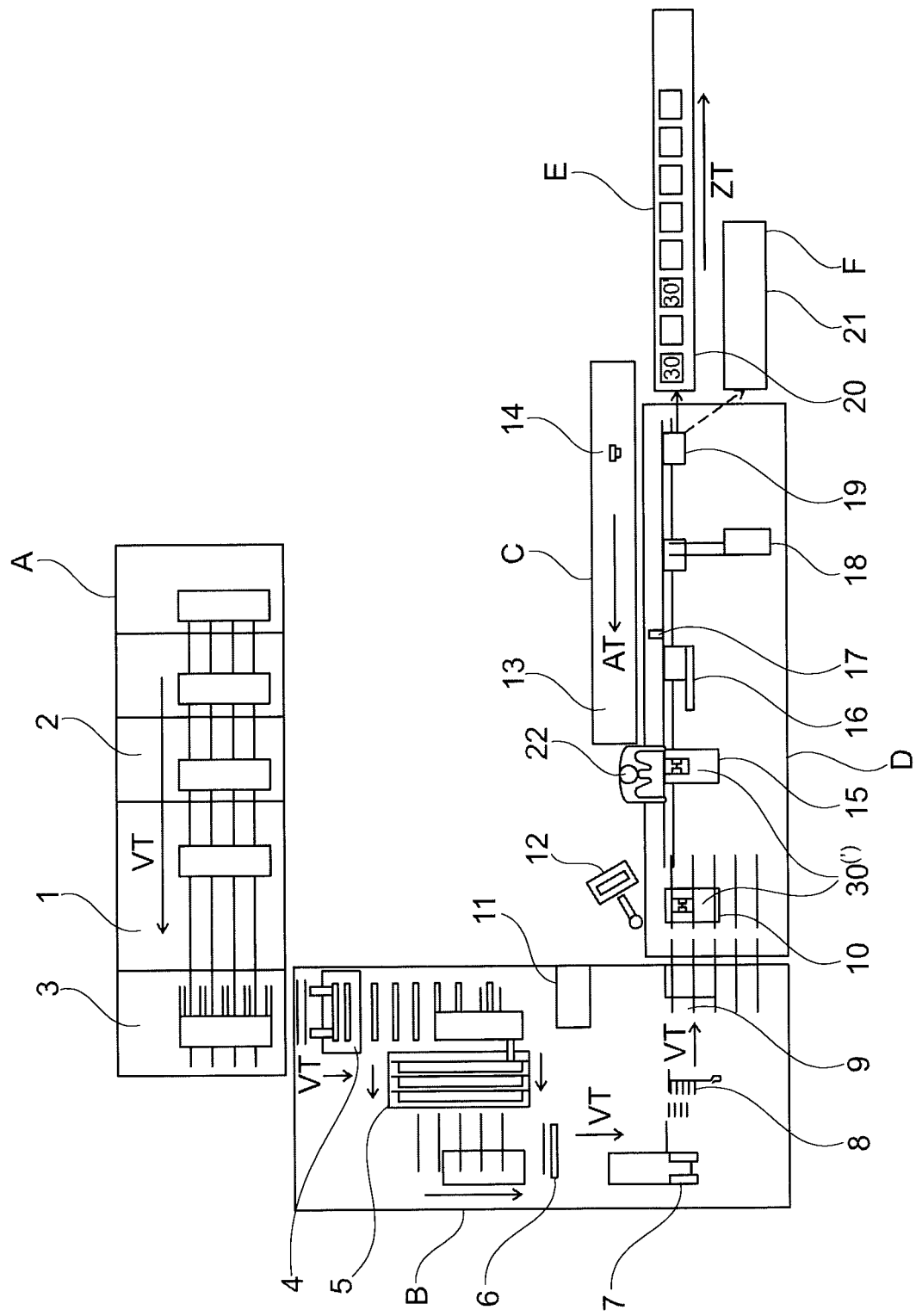

FIG. 7 shows a packaging system according to the invention and shows not only the subsystems necessary for the function according to the invention, such as carton feed A with carton feeder 1, cartoning machine B, packing station 15, and article transport unit C, but also further optional subsystems. The computer interface is not shown here, since similar systems are known in principle in the field of industrial plant control. The carton feed A shown in FIG. 7 comprises not only the carton feeder 1, but also further additional carton feeders 2. By virtue of the one or more carton feeders 1, 2, uniform main blanks BZ with the sides X, Y are separated from a carton stack and for example are set down on a plurality of parallel conveyor belts. Conventional carton feeders with a stacking capacity up to 500 pieces or up to 1500 pieces may be used. The carton feed can be equipped with additional carton feeders 2 depending on the requirements, so as to have available a suitable carton feeder 1, 2 for different sizes of main blank BZ. At the end of the carton feed A shown here, an infeed for orienting the different main blanks BZ is provided in the direction of the cartoning machine, so as to transfer the blanks BZ to the cartoning machine B. A separate infeed 3 of this kind may be omitted in the case of a carton feed A comprising just one carton feeder 1, if the orientation can be performed by or in the region of the carton feeder. In the shown cartoning machine B the main blank BZ is firstly positioned exactly, for example with use of roller pairs, and is grooved and/or perforated and cut as necessary in a longitudinal processing station. Here, the folding lines A parallel to the side X and corresponding parallel cuts T (for example $T_7$, $T_5''$, $T_6''$, etc.) are produced by way of example. The grooving and perforation may be performed by means of wheels, cutting or a combined cutting and perforation, for example with oscillating blades, as the blanks are passed through. Similarly, the grooving, perforation and/or cutting of the folding lines B parallel to the side Y or severing lines parallel thereto (for example $T_5$, $T_6$, $T_8$, $T_1''$, $T_2''$, $T_3''$, $T_4''$, etc.) are/is performed in the subsequent transverse processing station 5. The transport between the individual stations can be realised via rolls and/or conveyor belts. In the subsequent folding facility 6, an insert for example in accordance with FIGS. 2 and 4 may be folded and is only assembled in the subsequent folding facility 7. Individual severing lines or all severing lines may also be provided in the station 6 or 7. In the following folding and gluing station 8, the insert is glued to the rest of the packaging, for example by applying hot glue, is folded to a finished state in the folding station 9, and is glued to a finished state as necessary, and is then turned through 180° in the turning station 10, so that the open packaging is delivered to the packing station 15 in a manner directed upwardly and with the front side wall towards the insertion staff or insertion robot. For packagings as are shown in FIGS. 3 and 5, the stations 6 to 9 may be adapted such that the different adhesive tabs (for example 33", 35", 45", etc.) may be glued there as well. Similarly, the packaging is turned in the station 10, if necessary. The station 10 is assigned to the packaging unit, extended here by a checking unit 19, but may also be part of the cartoning machine. The articles, or objects, fed in the article transport direction AT via the article-transporting unit C are inserted at the insertion station 15 into the packaging 30, 30' by the operator or also a robot (for example Scara robot). The dimensions of the individual objects to be packaged are detected by an object identifier 14, which at the same time may have a counting function. Additionally or alternatively, the object identifier may also be configured as a code reader. The data determined by the object identifier 14 are sent to a computer interface and the issuing of a corresponding main blank by the carton feed A, and the corresponding actuation of the cartoning machine B are controlled by said computer interface, either directly or via connected subsystems. In the case of manual operation, the process may be interrupted or restarted at any time by the operator 22 via the control panel 12. Alternatively, an insertion robot may be used instead of the operator, which robot communicates with the computer interface. The packing unit D of the packaging system in the present case also comprises a folding facility 16 in order to fold the packaging closed, an application station 17 for hot glue, which applies hot glue to the closure, and a closing and labelling station 18 for marking and addressing the product. A monitoring station 19 follows on downstream and checks whether the packagings have been correctly closed. This may be checked mechanically and/or preferably by way of an optical recognition system. Packagings 30, 30' closed correctly are then intercepted by a removal device E or are deposited onto said device, for example a removal belt 20. Defective packagings are intercepted by a reject receptacle F or are set down on said receptacle, for example a further removal belt 21.

Although different embodiments of the invention with partly different features have been discussed in the above description, it is stated here expressly that the present invention in principle comprises all combinations, in particular also combinations of features presented only with reference to one example with other exemplary embodiments which have not been described here explicitly, unless such an embodiment would be considered absurd from the outset by a person skilled in the art.

The invention claimed is:

1. A method for producing a reusable packaging from a carton, in which a rectangular main blank with sides X and Y and an overall area xy is provided and $$2(a+h) \leq x \leq 3(a+h)+a$$

and $$y-2(h+r) \leq b \leq y,$$

wherein x and y respectively correspond to lengths of sides X and Y of the blank, a and b correspond to side dimensions of a footprint area of a finished packaging formed from the blank, h corresponds to a height of the finished packaging, and r corresponds to a width of a periphery region R of the finished packaging which forms a cavity in the finished packaging and is accessibly from outside the finished packaging, and wherein the method comprises the following steps:

producing folding lines $B_n$ in the main blank parallel to the side Y at least at the following distances from the side Y:
$B_1$: $a_1=h$
$B_2$: $a_2=h+a$
$B_3$: $a_3=2h+a$; and producing folding lines $A_n''$ in the main blank parallel to the side X at the following distances from the side X:
$A_1''$: $b_1=h$
$A_2''$: $b_2=h+r$
$A_3''$: $b_3=y-(h+r)$
$A_4''$: $b_4=y-h$ wherein, by virtue of severing at least four severing lines $T_3''$ and $T_4''$, which are arranged oppositely in pairs and each of which start from opposite sides X, along at least one of the folding lines $B_n$, a distance between two severing line end points $E_T$ which are closer to an axis of symmetry $S_1$ of the blank, which is parallel to the side X, corresponds to a length b″ of a side B″ of the finished packaging; and wherein at least four angled cuts $T_1''/T_5''$ and $T_2''/T_6''$ are formed along areas formed by the folding lines $A_n''$, $B_n$ with sides of lengths h and r.

2. The method according to claim 1, wherein a length t of the severing lines $T_3''$ and $T_4''$ satisfies:

$h \leq t < y/2$.

3. The method according to claim 1, wherein at least one folding line $B_n$ is formed only in a region between two severing lines $T_3''/T_4''$ extending the at least one folding line $B_n$.

4. The method according to claim 1, wherein said method comprises producing one or more of the following folding lines $B_n$ of the main blank parallel to the side Y at the following distances from the side Y:

$B_4$: $a_4=2(h+a)$
$B_5$: $a_5=2(h+a)+h$
$B_0$: $a_0=0$.

5. The method according to claim 4, wherein at least one perforation line is provided in a region of at least one closure tab of the blank, parallel to and/or on one of the folding lines $B_n$.

6. The method according to claim 1, wherein the angled cuts are made in a region between the side Y and $B_1$ and/or between $B_2$ and $B_3$.

7. The method according to claim 1, wherein the angled cuts are made in a region between $A_1''$ and $A_2''$ and between $A_3''$ and $A_4''$.

8. The method according to claim 1, wherein the length x of the side X of the main blank satisfies:

$2(a+h) \leq x \leq 3(a+h)$.

9. The method according to claim 1, wherein the folding lines are produced by grooving and/or by perforation.

10. The method according to claim 1, wherein at least the height h and/or the side dimension a is corrected by once or many times a thickness d of the carton.

11. The method according to claim 1, wherein the carton is constructed from the blank such that an article can be inserted into the carton.

12. A packaging that is produced from a main blank BZ of a carton by a method according to claim 1, wherein the packaging at least in its closed state is mechanically reinforced at least in relation to two of its side walls by two further support walls, wherein the support walls are each connected to the packaging via at least one of the folding lines $A_n''$, $B_n$.

* * * * *

UNITED STATES PATENT AND TRADEMARK OFFICE
CERTIFICATE OF CORRECTION

| | |
|---|---|
| PATENT NO. | : 11,214,389 B2 |
| APPLICATION NO. | : 16/608394 |
| DATED | : January 4, 2022 |
| INVENTOR(S) | : Marcel Stalder |

It is certified that error appears in the above-identified patent and that said Letters Patent is hereby corrected as shown below:

In the Specification

Column 2, Line 27: please remove the phrase "preferably at $t=t+h$." and replace it with -- preferably at $t=r+h$. --

Column 4, Line 19: please remove the phrase " $t_7=r+h+o=(t-n)/2$ from the" and replace it with -- $t_7=r+h+o=(y-n)/2$ from the --

Column 4, Line 59: please remove the phrase "$A_3$': $b_3=y-(h+r)$" and replace it with -- $A_3$": $b_3=y-(h+r)$ --

Column 4, Line 60: please remove the phrase "$A_4$':$b_4$-y-h" and replace it with -- $A_4$":$b_4$-y-h --

Column 5, Line 4: please remove the phrase "h and r or and h." and replace it with -- h and r or h and h. --

Column 7, Line 37: please remove the phrase "dimensions can thus" and replace it with -- dimensions can thus be --

Column 12, Line 32: please add the phrase "Fig. 7 packaging system" after "Fig. 6 closure variant"

Signed and Sealed this
Twentieth Day of September, 2022

Katherine Kelly Vidal
*Director of the United States Patent and Trademark Office*